(12) United States Patent
Theiss

(10) Patent No.: US 11,608,875 B2
(45) Date of Patent: Mar. 21, 2023

(54) HIGH-SPEED STROKE-TYPE MOVING DEVICE WITH A SUPPLY LINE, AND POWER TRANSMISSION CHAIN HEREFOR

(71) Applicant: igus GmbH, Cologne (DE)

(72) Inventor: Georg Theiss, Cologne (DE)

(73) Assignee: IGUS GMBH, Cologne (DE)

( * ) Notice: Subject to any disclaimer, the term of this patent is extended or adjusted under 35 U.S.C. 154(b) by 1007 days.

(21) Appl. No.: 16/343,118

(22) PCT Filed: Sep. 15, 2017

(86) PCT No.: PCT/EP2017/073283
§ 371 (c)(1),
(2) Date: Apr. 18, 2019

(87) PCT Pub. No.: WO2018/072941
PCT Pub. Date: Apr. 26, 2018

(65) Prior Publication Data
US 2019/0257388 A1   Aug. 22, 2019

(30) Foreign Application Priority Data

Oct. 18, 2016   (DE) .................... 20 2016 105 840.6

(51) Int. Cl.
*F16G 13/16* (2006.01)
*B65H 75/44* (2006.01)
(Continued)

(52) U.S. Cl.
CPC ......... *F16G 13/16* (2013.01); *B65H 75/4449* (2013.01); *B65H 75/4478* (2013.01);
(Continued)

(58) Field of Classification Search
CPC ..... F16G 13/19; F16G 13/20; B25H 75/4449; B25H 75/4478; B25H 2511/142;
(Continued)

(56) References Cited

U.S. PATENT DOCUMENTS 1,350,986 A * 8/1920 Caudron ................... F16C 1/20
74/502.3
3,106,368 A  10/1963 Tait et al.
(Continued)

FOREIGN PATENT DOCUMENTS

DE    10017514    10/2001
DE    69814799    1/2004
(Continued)

OTHER PUBLICATIONS

English translation of International Search Report from corresponding PCT Appln. No. PCT/EP2017/073283, dated Jan. 2, 2018.
(Continued)

*Primary Examiner* — David M Fenstermacher
(74) *Attorney, Agent, or Firm* — Grossman, Tucker, Perreault & Pfleger, PLLC

(57) ABSTRACT

A high-speed stroke-type moving device for an elongate flexible body having at least one supply line. The device has a guideway for guided displacement of the body, having a spiral portion, in which at least part of the body is compactly accommodatable in a plurality of spaced tracks which are not in mutual contact and extend substantially spirally inwards. The invention provides that the body has a line guideway for the at least one supply line. According to the invention, the line guideway here has a first sub-portion which is guided in the spiral portion and an unguided second sub-portion having a first end which is connected at the end to the first sub-portion and a second end which is connected at the end to a rotary feedthrough for the at least one supply line. A corresponding device having an energy chain is furthermore disclosed.

18 Claims, 3 Drawing Sheets

(51) Int. Cl.
*F16G 13/20* (2006.01)
*H02G 11/02* (2006.01)
*H02G 3/04* (2006.01)

(52) U.S. Cl.
CPC .......... *F16G 13/20* (2013.01); *H02G 3/0462* (2013.01); *H02G 11/02* (2013.01); *B65H 2511/14* (2013.01); *B65H 2701/34* (2013.01); *B65H 2701/3911* (2013.01)

(58) Field of Classification Search
CPC ........ B25H 2701/34; B25H 2701/3911; H02G 3/0462; H02G 11/02
See application file for complete search history.

(56) References Cited

U.S. PATENT DOCUMENTS

| | | | |
|---|---|---|---|
| 6,016,844 | A | 1/2000 | Takahashi et al. |
| 9,222,601 | B2 | 12/2015 | Fischer |
| 2018/0026432 | A1 | 1/2018 | Hermey et al. |
| 2018/0216703 | A1* | 8/2018 | Etori ..................... F16H 27/02 |
| 2018/0320757 | A1* | 11/2018 | Tetsuka ................. H02G 11/00 |
| 2019/0257388 | A1* | 8/2019 | Theiss ................ B65H 75/4478 |
| 2019/0322501 | A1* | 10/2019 | Seigneur ................ F16G 13/06 |
| 2020/0099205 | A1* | 3/2020 | Yamamoto ............ B60R 16/027 |
| 2021/0151966 | A1* | 5/2021 | Yamamoto .......... B60R 16/0215 |
| 2021/0173381 | A1* | 6/2021 | Edsinger ................ B25J 18/025 |
| 2021/0197408 | A1* | 7/2021 | Yoo ......................... B25J 9/102 |
| 2021/0364068 | A1* | 11/2021 | Wolf .................... F16H 19/0636 |
| 2022/0055087 | A1* | 2/2022 | Fischereder ......... B21D 37/145 |
| 2022/0074519 | A1* | 3/2022 | Hiraoka .................... F16L 3/26 |

FOREIGN PATENT DOCUMENTS

| | | |
|---|---|---|
| DE | 102004059895 | 9/2005 |
| DE | 102012110067 | 5/2014 |
| DE | 102013226954 | 6/2015 |
| DE | 202015100484 | 4/2016 |
| EP | 0531320 | 4/1994 |
| EP | 2535303 | 12/2012 |
| FR | 1253794 | 4/1959 |
| GB | 1172560 | 12/1969 |

OTHER PUBLICATIONS

English translation of International Preliminary Report on Patentability from corresponding PCT Appln. No. PCT/EP2017/073283, dated Jan. 9, 2019.

* cited by examiner

HIGH-SPEED STROKE-TYPE MOVING DEVICE WITH A SUPPLY LINE, AND POWER TRANSMISSION CHAIN HEREFOR

FIELD

The invention relates to a high-speed stroke-type moving device for an elongate, flexible body, such as for example a roller shutter of a cover, a slatted roller shutter leaf of a lifting door or the like, and also in general for a chain or a cable for power transmission in a machine, in particular for a push/pull chain. The invention likewise relates to an energy chain for such a device.

BACKGROUND

The term body should in the present case be understood in its broadest meaning. It includes a link chain in the sense of a concatenated sequence of link-like elements of any desired configuration, i.e. not only but also a power-transmitting drive chain. To ensure their high-speed characteristics, the elements should here be of a construction which is sufficiently resistant to tensile and compressive forces in the direction of travel and be swivelable relative to one another. In the present case, however, the term body also includes a flexible, one-piece cable or a flexible, one-piece belt, in particular for power transmission.

For the purposes reeling or rolling in or out, it is usual practice in many fields to wind the respective bodies, if they are also to be compactly retracted and advanced, onto or off a drum-like shaft. Roller shutters for window openings are one well-known example. This principle, however, is associated with various disadvantages, including static problems arising from uneven loading due to the polygon effect of rigid elements and kinematic problems, such as for example a stroke speed which is dependent on the rotational position because, when the axle of the winding shaft is driven conventionally, the running speed changes with rotational position.

Above all, however, the drum principle generally severely limits the maximal achievable stroke speed or running speed due firstly to the friction and pressure forces arising on the bodies and secondly to the additional inertia, in particular of the wound shaft or drum. This applies in particular to long and/or heavy bodies.

"Spiral fittings" for providing comparatively high stroke speeds have been developed in high-speed door applications for closing building openings. This involves a generic guideway having a linear portion of conventional design for an outward and return stroke which is guided linearly or in a straight line or for the desired displacement of the body, and having a special spiral portion which in particular serves for retraction and advance into or out of a compact storage space. The vital factor here is the particular design of the spiral portion which compactly accommodates part or all of the body, namely in a plurality of spaced tracks or turns which are not in mutual contact and extend substantially spirally inwards. The individual turns or "layers" of the flexible body are here guided completely without mutual contact. Consequently, no friction or pressure forces can arise between opposing links. The body is thus not rolled up or rolled out on/from itself with superposed turns. The solution is nevertheless similarly compact. It additionally also permits out-of-round or elongate courses for "oval spirals".

Such a spiral guideway, specifically developed for high-speed doors, is known for example from patent specification EP 0 531 320 B1. A similar spiral guideway for a slatted roller shutter was described in patent specification GB 1 172 560 A.

Considerably higher speeds, in particular also with long and/or heavy bodies, can be achieved with this kind of contactless spiral guideway. It largely avoids the known problems of drum-like winding and unwinding devices. Such spiral guideways are used not only for slatted roller shutters or covers, but also in other fields of mechanical engineering when high-speed running of a chain-, cable- or belt-like body which can simultaneously be compactly retracted is necessary or desirable, such as for example in a push/pull chain or, generally, in a drive chain.

It is additionally known to equip a high-speed stroke-type moving device with at least one supply line for various purposes. Accordingly, a light barrier, which prevents the door from closing if a person or object is present, is typically provided, for example for safety, in the linear portion in high-speed doors.

Providing the line for the stationary part of the stroke-type moving device is in principle unproblematic. Due, firstly, to the complex movement and, secondly, to the absence of a conventional drum or the inner end of the body non-rotatable thereon, it is not straightforwardly possible with spiral guideways, unlike with drums, to equip the displaceable body, in particular the outer end region thereof, with a supply line. This may, however, be desirable for many applications, for energy, signals, liquid and/or gaseous operating media. Examples which may be mentioned are sensors located at the end, such as limit switches, impact sensors, etc. or also for a consumer, for example an actuator, located at the end.

SUMMARY

A first object of the present invention is therefore to propose a solution which permits reliable supply to the body, in particular to the outer end region of the body which passes through the typical linear portion, on the basis of a supply line. It should here, if feasible, be possible to provide a highly durable, protected arrangement of the supply line(s).

In order to solve this problem in a generic high-speed stroke-type moving device, the invention provides that the flexible, elongate body has a line guideway for the at least one supply line, wherein this line guideway has a first sub-portion which is guided in the spiral portion, in particular but not necessarily by guidance of the body itself, and subsequently has an unguided second sub-portion which is in particular not guided or carried by the high-speed guideway. The second sub-portion is preferably of self-supporting construction.

The first end of the second sub-portion can be connected at the end to the guided first sub-portion and the second end thereof can be connected at the end to a rotary feedthrough for the at least one supply line. The unguided second sub-portion in any event connects the rotary feedthrough to the guided first sub-portion.

The proposed arrangement of the line guideway inter alia ensures a defined course or controlled movement sequence of the supply line in the region between the inner end of the guide in the spiral portion and the axis of rotation of the rotary feedthrough. Precisely at high speeds, this region is particularly critical, since the inner end of the body (observed in the absence of the line guideway) here performs a spiral orbital movement with an increasing or decreasing distance from the axis of rotation at the same velocity as the outward or return stroke of the outer end.

This complex movement through the line guideway can be bypassed by the unguided second sub-portion. The second portion may here in particular be arranged in the manner of an opening or closing arcuate portion, the notional circular arc chord or secant of which decreases or increases in length depending on the stroke position (travel position). The advanced end position then corresponds to the self-supporting extended position of the second sub-portion. In the retracted end position of the body, the second portion is "rolled up", in particular spirally, but without being guided in the spiral guideway. In combination with a rotary feedthrough, reliable and protected guidance of the line is provided.

In this manner, the supply line can extend from the rotary feedthrough to body and vice versa in a manner which is protected, in particular from kinking. In addition, the line guideway itself permits power transmission between the inner end and the rotary feedthrough without applying a load to the supply line. The arrangement additionally requires no additional installation space at the level of the guideway.

The body is elongate, preferably flexible in only one plane and should be resistant to tensile and thrust forces, i.e. be only slightly extensible or compressible in the lengthwise direction. It may extend in two dimensions or be cable-like in form.

Kinematically favorable conditions or good power transmission are achieved if the second sub-portion is configured firstly with a small bending radius observed in the direction of rotation of the spiral course and, observed contrary to said direction of rotation, i.e. in the opposite direction of rotation, secondly with a very large, in particular linearly self-supporting, backwards bending radius. In order to ensure compact "rolling up", it is here advantageous for the second sub-portion to have a bending radius in the direction of rotation which is less than or equal to the innermost curvature of the spiral portion, i.e. the end curvature of the innermost spiral turn. The large backwards bending radius, which preferably tends towards infinity, permits thrust transmission onto the rotary feedthrough and avoids a breakaway or reversal contrary to the direction of rotation of the spiral. The second sub-portion should be readily and sufficiently flexible in the one direction (direction of rotation of the spiral) but not or only to a distinctly lesser extent in the opposing direction. Due to the guideway, the bending radii of the first sub-portion and of the remainder of the line guideway, in contrast, are immaterial.

Towards the remainder of the guideway, in particular towards a typically present linearly guiding portion, the spiral portion of the guideway conveniently has an inlet or transition at the radially outer end thereof. The length of the second sub-portion of the line guideway is here preferably selected to be at least as large as and preferably larger than the distance measured in the radial direction between the axis of rotation of the rotary feedthrough and the radial position of the inlet. The length of the first sub-portion is in principle immaterial. It can only amount to a proportion of the entire length of the elongate body but should amount at least to the length of the spiral portion. The line guideway can extend over the entire length of the body, for example if the outer end is to be supplied, and to this end can optionally comprise a further third functional portion.

For the purposes of the invention, the body, in particular an application-specific link chain, for example a push/pull chain, can be modified such that it forms the line guideway and to this end has a line duct for the at least one supply line.

Alternatively, the line guideway can be of separate construction, in particular in the form of an energy chain. The latter then preferably extends at least over the length of its two sub-portions parallel to the body and can for example, with the exception of the unguided second portion, also be carried on the body or be guided overall without a separate, dedicated guideway.

Application-specific adaptation of an energy chain to the desired use of the body, for example as a push/pull chain, likewise falls within the scope of the invention.

An energy chain of known design has a plurality of chain links which are swivelable relative to one another, are connected together in pairs by an articulated joint and form a line duct for protected guidance of the at least one supply line, for example an electrical cable or a hydraulic or pneumatic hose. The chain links can in particular be made of plastics.

Due to the nature of its construction, an energy chain is surprisingly well suited to cooperating with spiral guideways or to being arranged in the spiral portion since it can straightforwardly extend in turns which are not in mutual contact or it follows a track which extends spirally inwards.

In a further independent aspect, the invention accordingly also relates to a device having an energy chain for a supply line and a high-speed guideway, typically with a linear portion of conventional design together with a spiral portion as a compact store in which at least part of the chain is compactly accommodated. In the spiral portion, the energy chain proceeds in a plurality of spaced tracks or turns which are not in mutual contact and extend substantially spirally inwards. A rotary feedthrough for the supply line is furthermore provided. Also in the embodiment in which the energy chain forms the body or vice versa, this chain has a first sub-portion which is guided in the spiral portion and an unguided, preferably self-supporting second sub-portion. The second sub-portion connects the first sub-portion to the rotary feedthrough and, in particular by the first end thereof, can be connected at the end to the guided first sub-portion and, by the second end thereof, can be connected to a rotary feedthrough for the at least one supply line.

In one embodiment, the unguided sub-portion simultaneously serves for power transmission to the rotary feedthrough, wherein the latter has a stationary connection side and a rotatable connection side. For the purposes of power transmission, the second sub-portion is preferably in direct mechanical engagement with the rotatable connection side in such a manner that the rotatable connection side is co-rotated in accordance with the retraction and advance of the body. In such an embodiment, the second end of the unguided second sub-portion may be non-rotatably connected, in particular in power-transmitting manner, to the rotatable connection side. The second sub-portion, in particular in an extended but at least self-supporting arrangement, here acts in the manner of a connecting rod or pushrod which drives the rotatable connection side of the rotary feedthrough.

A conventional rotary joint for gas or liquid, or a slipring arrangement for electrical power or signals can be considered as the rotary feedthrough.

The at least one supply line, such as for example a cable, hose or the like can pass uninterruptedly from the stationary connection side via the rotatable connection side to the line guideway or energy chain.

This is made possible if the rotary feedthrough has a helical course having one or more first helical turns, in which the supply line is wound around an axis of rotation, one or more second helical turns, in which the supply line is wound in the opposite direction around the axis of rotation, and a deflection arc which connects the two helical turns.

The at least one supply line is here reversed in the deflection arc. The advantage over conventional rotary feedthroughs, such as for example electrical sliding contacts or hydraulic rotary joints, is firstly that leaky or lossy breaks are entirely avoided and secondly that it is also possible straightforwardly to guide a plurality of lines for various media or signal and power supplies from the fixed point to a rotating point.

A suitable rotary feedthrough of this kind was proposed by the applicant in patent specification WO 2011/086198 A2 and reference is made to the full content thereof with regard to the structure of the rotary feedthrough. The limited angle of rotation of such rotary feedthroughs can here readily be adapted to the required total length of stroke (length of travel) by a sufficient number of helical turns.

In particular when the latter-stated design of the rotary feedthrough is used, the rotatable connection side of the rotary feedthrough which is mechanically connected to the body is preferably driven solely by the second sub-portion of the chain. It can, however, also be equipped with a restoring spring which is tensioned during the forwards rotation corresponding to the outward stroke of the body or chain and, during the return stroke, assists the backwards rotation of the connection side. A restoring spring tension which assists rolling up of the second sub-portion of the line guideway or energy chain around the rotatable connection side of rotary feedthrough accordingly acts in the fully advanced state. The restoring spring can be pretensioned in the completely retracted state. Motor drive of the rotary feedthrough is required in neither case, whether with or without the spring.

A simple construction of the high-speed guideway comprises two guide profiles, in particular with a substantially U-shaped profile cross-section, for example guide rails, arranged parallel opposite one another. The course of the profiles defines the spiral portion and optionally one or more linear portions. In particular, the first sub-portion may have guide pins projecting laterally at both sides which fit such a profile cross-section and are longitudinally displaceably and slidingly guided in the profiles, while the second sub-portion has no such guide pins. The guide pins may, for example, be provided by excess length of the connecting pins in the articulated joint of selected chain links which are naturally at the favorable neutral axis height, or they may alternatively be arranged or formed in another manner on the links, in particular at neutral axis height. Guide pins or the like are preferably provided at regular intervals, optionally on every n-th chain link, wherein n>>2 may apply. Rollers which roll in the profiles may be provided on the chain or the body instead of a plain bearing with journals. This is advantageous in particular at high speeds since friction is reduced. In one particularly simplified construction, the first sub-portion is carried by the guideway of the body while the self-supporting second sub-portion is not guided by the guideway. The guided first sub-portion need not necessarily be carried by the guideway, in particular by the spiral portion thereof. A suitably dimensioned additional guideway may be associated with, for example parallel to, the line guideway or energy chain.

The spiral portion may be generally spiral in form, having at least in portions inwardly leading regions with an abruptly or constantly increasing curvature. It may for example be configured as a constantly curved spiral shape of the nature of a round spiral or of the nature of an oval spiral, in particular with interposed straight or less strongly curved portions connecting the spiral arcs. An oval spiral makes it possible, while increasing the size in one spatial direction, to obtain a particularly compact and space-saving size in another, in particular perpendicular, spatial direction, for example with only a triple overlap, i.e. optionally with only one and a half rotations.

Curvature limits can be particularly readily implemented in energy chains. This may, for example, firstly be achieved by the chain links of the energy chain having, at least in the second sub-portion, a swivel angle limit stop at each articulated joint, which limit stop is selected such that the second sub-portion has a bending radius in the direction of rotation of the spiral which is less than or equal to the innermost curvature of the spiral portion. Secondly, the second sub-portion of the chain may have an extension angle limit stop at each articulated joint, which limit stop is selected such that the second sub-portion extends in extended manner contrary to the direction of rotation of the spiral. Ensuring that backwards flexure in the second sub-portion is as low as possible means that this thrust force can be transmitted and that reversal contrary to the desired direction of rotation of the spiral is avoided.

In a preferred embodiment, in the case of a body in the form of an energy chain, the length of the second sub-portion also corresponds at least to the radial distance between the axis of rotation and the radial position of the inlet in the spiral portion. This length may be increased by at least half the circumference of the rotatable connection side of the rotary feedthrough, such that, even in the fully advanced state, the second sub-portion of the energy chain is still wrapped around at least half the circumference of the rotary feedthrough. As a result, power transmission to the rotary feedthrough in the tensile direction can primarily be by frictional engagement during the outward stroke up to the end position. The tensile load on the second end which is non-rotatably connected at the end to rotary feedthrough is accordingly minimized.

In a preferred embodiment, a drive, in particular an electric motor, is in mechanical operative connection on the output side with the body in order to drive the latter alternatively on the outward and return strokes. The rotatable connection side of the rotary feedthrough may here be drivable via the line guideway or energy chain, i.e. the rotatable connection side of the rotary feedthrough does not require its own drive. An arrangement comprising two synchronously running drives, which is more complex in control systems terms, might also be conceivable in order to avoid excessive tensile/thrust stresses, for example in the case of very great lengths or heavy line loads. One drive directly on the body is favorable for the desired high-speed running and should engage on the linear portion.

The device according to the invention can be used to achieve high-speed running in various fields, for example for a drive chain for thrust and/or tensile force transmission in a machine, for a roller shutter of a machine cover or for the slatted roller shutter of a high-speed lifting door.

Equipping the flexible body, optionally in per se known form such as for example a high-speed lifting door, with a supply line which is guided in protected manner by the line guideway or energy chain according to the invention opens up the most varied new design options, for example with regard to sensors and/or actuators, at the free outer end.

Thanks to compact storage, the proposed construction additionally permits a coaxial or axially parallel arrangement of a plurality of bodies with a supply line in a confined installation space. For example, a double high-speed stroke-type moving device with two axially parallel arranged spiral portions accordingly falls within the scope of the invention.

BRIEF DESCRIPTION OF THE DRAWINGS

Further features of the invention are revealed by the appended figures, on the basis of which a preferred exemplary embodiment of the invention is explained below without restricting the general nature of the above description. Identical or similar elements are labeled with the same reference signs in the figures, in which.

DETAILED DESCRIPTION

Figure 5:
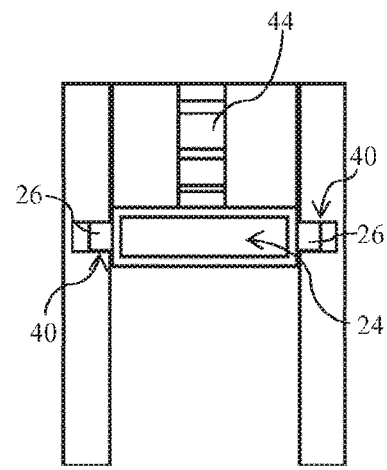
FIG. 5 shows a magnified region from the front view in FIG. 3 in which the chain emerges from the guideway.

An exemplary high-speed guideway is generally designated 10 in FIGS. 1-5. The high-speed guideway 10 comprises an elongate, flexible body, in the present case a drive chain 12, for transmitting thrust and/or tensile force in a machine (not shown in any greater detail), and is guided in a guideway 14. The guideway 14 has two linear portions 16A, 16A which are connected via an arc and in which the drive chain 12 is guided linearly. A spiral portion 18 with a spiral course corresponding to an Archimedean spiral, i.e. in which the turn spacing (distance between the turns 19 measured in the radial direction) is constant, allows the drive chain 12 to be rolled up compactly. The high-speed guideway 10 shown here has guide profiles 40 in two parallel, opposing plates (cf. FIG. 3) which define the desired course of the linear portions 16A, 16A and of the spiral portion 18. Alternatively, guide rails or similar slotted link-like guideways having the desired curved course can be used. The guide profiles 40 take the form, for example, of milled grooves with an approximately U-shaped profile cross-section (FIG. 5). Guide pins 26, which project from opposite sides of the drive chain 12, engage displaceably in the guide profiles 40 or guide grooves in sliding, curvilinear manner in the lengthwise direction of the drive chain 12. The guide pins 26 are mounted at regular intervals, for example on every n-th chain link, on the drive chain 12, and may for example take the form of lengthened bearing journals of the articulated joint.

Figure 1B:
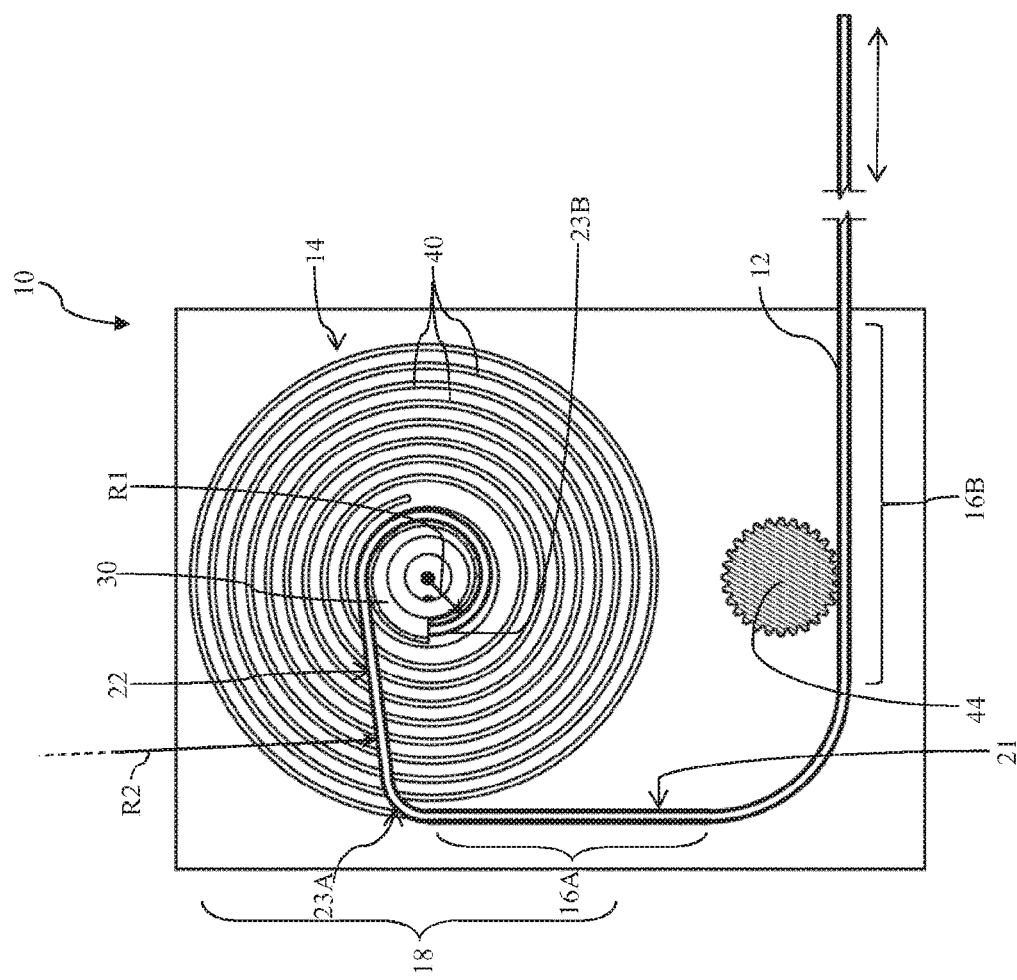
FIGS. 1A-1B show a vertical section through a high-speed stroke-type moving device with a link chain, depicted in the fully retracted state (FIG. 1A) and in the fully advanced state (FIG. 1B)
Figure 1A:
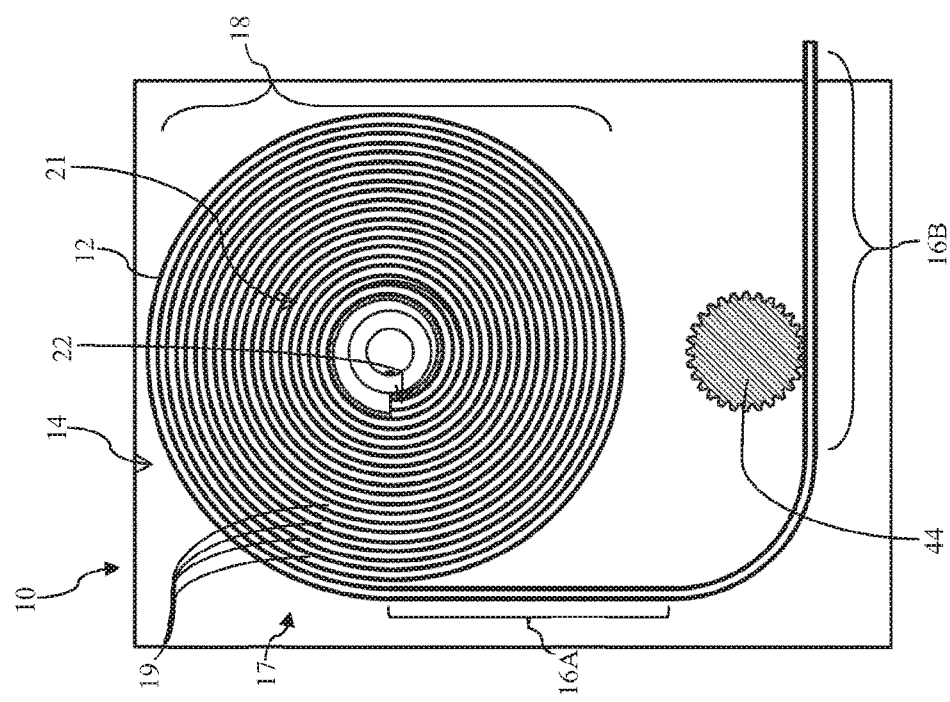
Figure 2A:
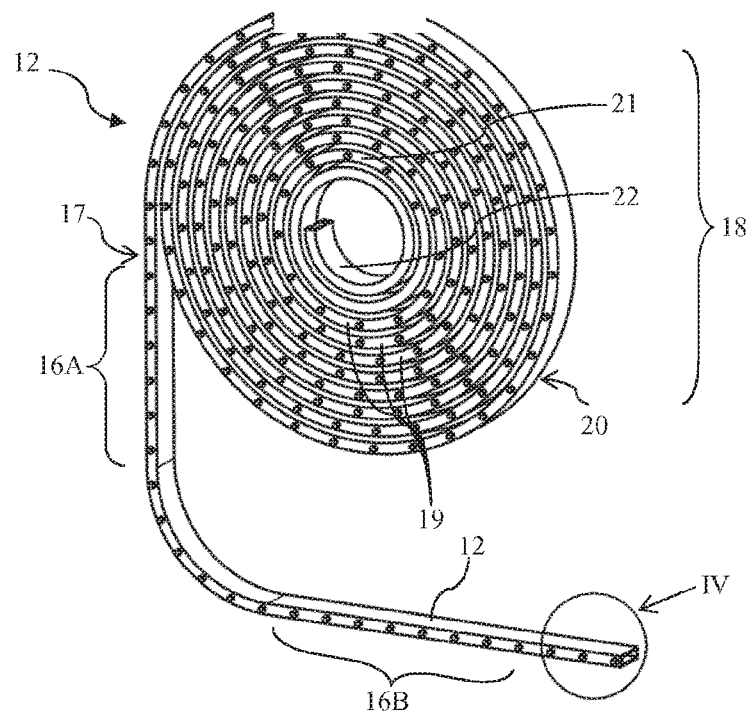
FIGS. 2A-2B show the link chain, embodied as a line guideway, of the stroke-type moving device in perspective view, in fully retracted (FIG. 2A) and fully advanced state (FIG. 2B)
Figure 2B:
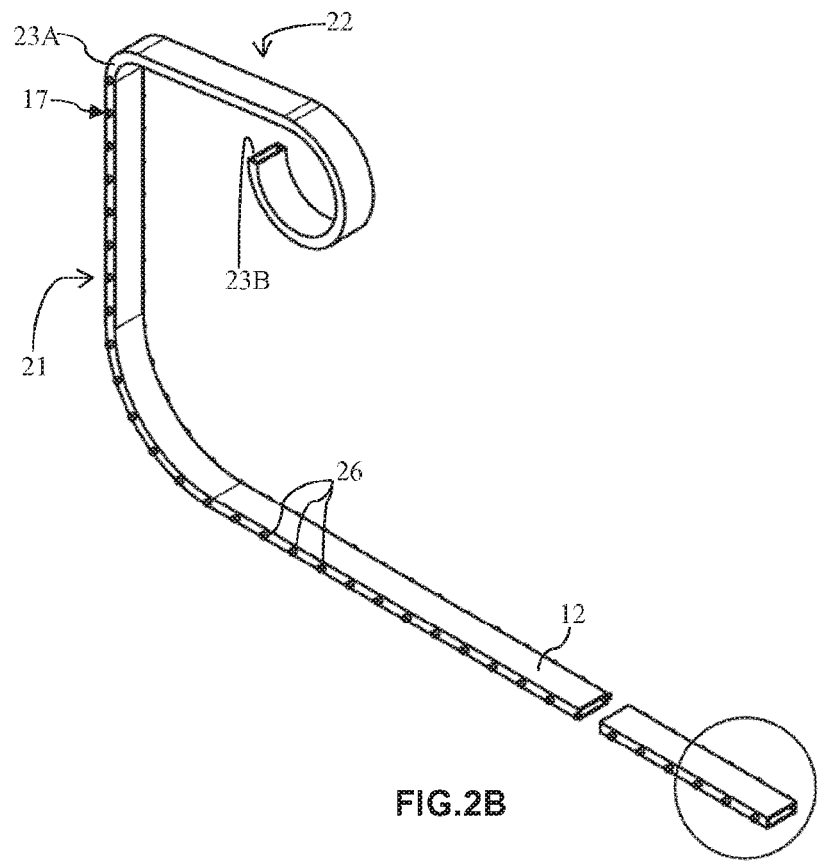

The spiral portion 18 compactly accommodates the predominant part on retraction of the chain 12 (FIG. 1A). As is most clearly apparent from FIG. 1A, the drive chain 12 is here accommodated in the spiral portion 18 in such a manner that a plurality of turns 19 proceed substantially spirally inwards without mutual contact, i.e. with space therebetween. As an alternative to the Archimedean round spiral shown here, an oval spiral is also conceivable, for example if structural height is to be reduced.

In FIGS. 1-5, the chain 12 itself acts as a line guideway 20 for supply lines (not shown) and, to this end, has an internal line duct 24 which is bounded by side parts. The line guideway 20 thus takes the form of an energy chain. The line guideway 20 may, for example, comprise a plurality of chain links (not shown) which are swivelable relative to one another, are connected together in pairs by an articulated joint and form the line duct 24 for protected guidance of the supply lines.

The line guideway 20 has a first sub-portion 21 which, on retraction, is guided in the spiral portion 18 and comprises an always unguided second sub-portion 22 which is not in engagement with the guide profiles 40 of the guideway 14, as is apparent from FIG. 1B.

The first end 23A of the second sub-portion 22 is connected at the end to the first sub-portion 21. The second end 23B thereof is connected at the end to a rotary feedthrough 30 (FIG. 3) for a plurality of supply lines. A course of the unguided second sub-portion 22 which is free in the main plane can simply be achieved by the second sub-portion 22, unlike the first sub-portion 21 of the line guideway 20, having no guide pins 26 which engage in the guide profiles 40. The second sub-portion 22 has a small bending radius R1 in the direction of rotation of the spiral course which is selected to be less than or equal to the innermost curvature of the spiral portion 18.

In the contrary direction of rotation, the second sub-portion 22 has a very large backwards bending radius R2 which preferably tends towards infinity such that, when the chain 12 is fully advanced (FIG. 1B/FIG. 2B), it extends in extended, substantially self-supporting manner, i.e. does not sag in the opposite direction of rotation. In the case of the line guideway 20 being constructed in line with the principle of an energy chain, the radii R1, R2 can simply be set by suitable selection or dimensioning of the swivel angle limit stop and of the backwards extension angle limit stop.

Figure 3:
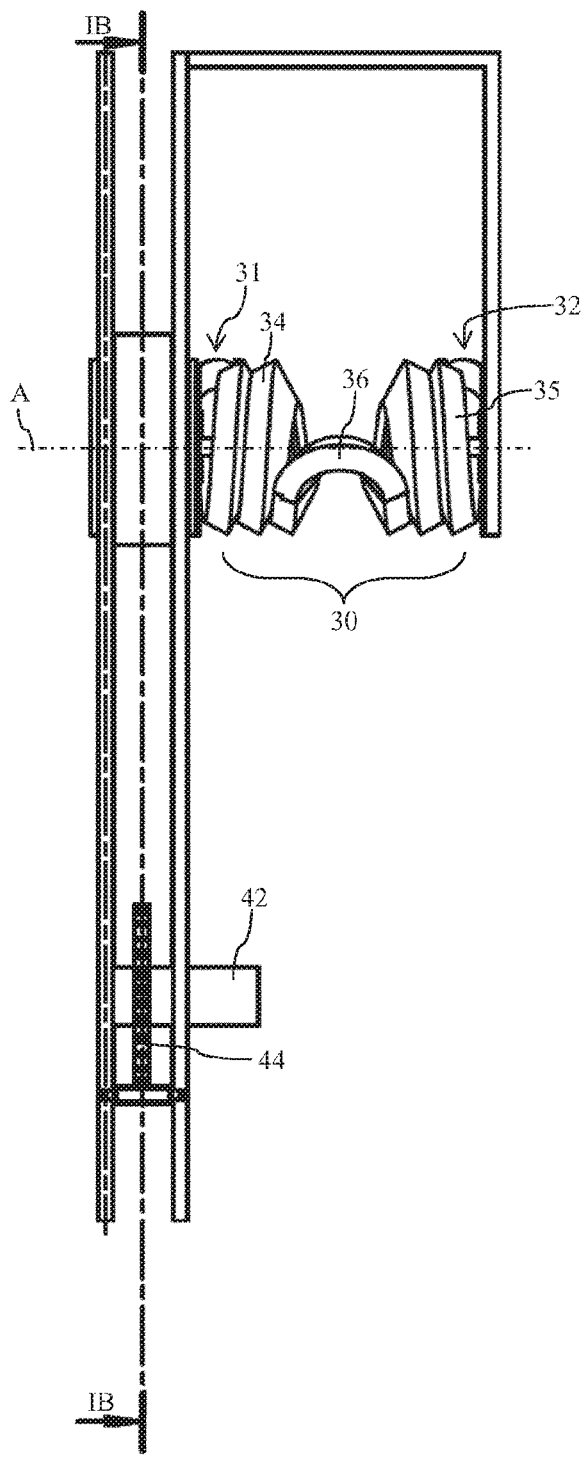
FIG. 3 shows a front view of the high-speed stroke-type moving device with a rotary feedthrough (and representation of section plane I-I in relation to FIG. 1B)
Figure 4:
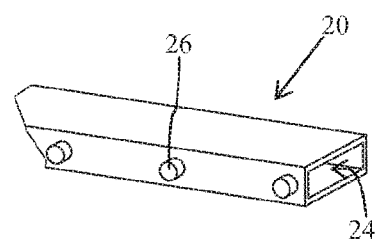
FIG. 4 shows the outer end of the link chain with the duct for the line guideway in magnified perspective view.

FIG. 3 shows a preferred design of the rotary feedthrough 30 in greater detail. It has a stationary connection side 31, a rotatable shaft which defines the axis of rotation A and a rotatable connection side 32. The second end 23B of the unguided second sub-portion 22 is connected in power-transmitting and non-rotatable manner to the rotatable connection side 32. The rotary feedthrough 30 forms a helical course with two first helical turns 34, in which the supply lines are wound around the axis of rotation A, and opposing second helical turns 35, in which the supply lines are wound in the reverse direction of rotation around the axis of rotation A. The helical turns 34, 35 are connected by an axially variable deflection arc 36 in which the lines reverse their direction of rotation. The distribution of the helical turns 34, 35 in number varies depending on the rotary position of the rotary feedthrough 30, wherein the deflection arc 36 moves axially. In order to avoid repetition, the corresponding full content regarding structure is incorporated from patent specification WO 2011/086198 A2. It should additionally be noted that the rotatable connection side 32 is preferably exclusively actuated by the unguided second sub-portion 22 of the drive chain 12. During the return stroke, the unguided second sub-portion 22 rolls onto a hollow shaft which is mounted on the shaft of the rotary feedthrough 30 coaxially with axis A (FIG. 3).

In the example shown here, the length of the second sub-portion 22 (measured in the lengthwise direction of the chain) amounts to the radial distance between the axis of rotation A of the rotary feedthrough 30 and the radial position of the inlet 17 increased by approx. ¾ of the circumference of the hollow shaft on the rotatable connection side 31 of the rotary feedthrough 30. In the fully advanced state (FIG. 1B/2B), the second sub-portion 22 is accordingly still wrapped around approx. 270° of the circumference on the rotatable connection side 31 of the rotary feedthrough 30 (FIG. 2B) such that power transmission during the outward stroke is predominantly by frictional engagement.

FIG. 3 best shows a drive 42, for example an electric motor, which has a gearwheel pinion 44 which is in direct mechanical engagement with the drive chain 12 and drives the latter for the outward and return stroke (cf. double-headed arrow in FIG. 1B). The axis of rotation is axially parallel to the axis of rotation A of the rotary feedthrough 30 or to the notional central axis of the spiral portion 18.

In the example shown according to FIGS. 1-5, the drive chain 12 can serve to transmit thrust and/or tensile force in a machine. Other applications of the high-speed stroke-type moving device with supply line are, however, also possible, for example in lifting doors, roller shutters, etc.

LIST OF REFERENCE SIGNS

- 10 High-speed guideway
- 12 Drive chain
- 14 Guideway
- 16A, 16B Linear portion
- 17 Inlet
- 18 Spiral portion
- 19 Turn (or track)
- 20 Line guideway/energy chain
- 21 First sub-portion
- 22 Second sub-portion
- 23A, 23B Ends (second sub-portion)
- 24 Line duct
- 26 Guide pin
- 30 Rotary feedthrough
- 31 Rotatable connection side
- 32 Stationary connection side
- 34, 35 Helical turns
- 36 Deflection arc
- 40 Guide profiles
- 42 Drive
- 44 Pinion
- A Axis of rotation
- R1, R2 Bending radius

What is claimed is:

1. A high-speed stroke-type moving device for an elongate, flexible body, having at least one supply line and comprising:
   a guideway for guided displacement of the body, having a spiral portion, in which at least part of the body is compactly accommodatable in a plurality of spaced turns which are not in mutual contact and extend spirally inwards,
   wherein the guideway has two guide profiles arranged parallel opposite one another, wherein the course of the guide profiles defines the spiral portion,
   wherein the body has a line guideway for the at least one supply line,
   wherein the line guideway
   comprises a first sub-portion which is guided in the spiral portion, wherein first sub-portion has journals or rollers projecting laterally at both sides, wherein the journals or rollers are slidingly or rollingly guided in the guide profiles, and
   wherein the line guideway comprises an unguided second sub-portion having a first end which is connected to the first sub-portion and a second end which is connected to a rotary feedthrough for the at least one supply line.

2. The high-speed stroke-type moving device as claimed in claim 1, wherein-the second sub-portion has a small bending radius in a direction of rotation of the spiral course and in an opposite direction of rotation is configured with a large, backwards bending radius.

3. The high-speed stroke-type moving device as claimed in claim 1, wherein the spiral portion has an inlet and a length of the second sub-portion at least corresponds to a distance between an axis of rotation of the rotary feedthrough and the inlet.

4. The high-speed stroke-type moving device as claimed in claim 2, wherein the second sub-portion has a bending radius in the direction of rotation which is less than or equal to an innermost curvature of the spiral portion.

5. The high-speed stroke-type moving device as claimed in claim 1, wherein the flexible body forms the line guideway and has a line duct for the at least one supply line.

6. The high-speed stroke-type moving device as claimed in claim 1, wherein the line guideway is of separate construction, in the form of an energy chain, and is provided on the flexible body.

7. A device comprising:
   an energy chain for at least one supply line, and
   a high-speed guideway comprising a spiral portion in which at least part of the energy chain is compactly accommodatable in a plurality of spaced tracks which are not in mutual contact and extend substantially spirally inwards,
   wherein the energy chain has a plurality of chain links which are swivelable relative to one another, are connected together in pairs by an articulated joint and form a line duct for protected guidance of the at least one supply line, and
   wherein the energy chain
   comprises-a first sub-portion which is guided in the spiral portion, and
   wherein the energy chain comprises an unguided second sub-portion having a first end which is connected to the first sub-portion and a second end which is connected to a rotary feedthrough for the at least one supply line.

8. The device as claimed in claim 7, wherein the rotary feedthrough has a stationary connection side and a rotatable connection side, and the second end is non-rotatably connected to the rotatable connection side.

9. The device as claimed in claim 7, furthermore comprising at least one supply line,
   wherein the rotary feedthrough has a helical course with one or more first helical turns, in which the supply line is wound around an axis of rotation, and one or more second helical turns, in which the supply line is wound in an opposite direction around the axis of rotation, and
   wherein a deflection arc which connects the first and the second helical turns and in which the supply line is reversed.

10. The device as claimed in claim 7, wherein the rotary feedthrough takes a form of a rotary joint for gas or liquid, or a slipring arrangement for electrical power or signals.

11. The device as claimed in claim 7, wherein the guideway has two guide profiles, having a substantially U-shaped profile cross-section, arranged parallel opposite one another, the course of which profiles defines the spiral portion and a linear portion subsequent the spiral portion.

12. The device as claimed in claim 7, wherein the first sub-portion is carried by the guideway and the second sub-portion is not guided by the guideway.

13. The device as claimed in claim 7, wherein the spiral portion is configured with a constantly curved spiral shape.

14. The device as claimed in claim 7, wherein the spiral portion is elongate in a manner of an oval spiral with straight portions which connect spiral arcs.

15. The device as claimed in claim 7, wherein the chain links of the energy chain comprise at least in the second sub-portion, a swivel angle limit stop at each articulated joint such that the second sub-portion has a bending radius in a direction of rotation of the spiral which is less than or equal to an innermost curvature of the spiral portion, and an extension angle limit stop such that the second sub-portion extends in extended manner in the an opposite direction of rotation.

16. The device as claimed in claim 7, wherein the spiral portion has an inlet and a length of the second sub-portion at least corresponds to a distance between the axis of rotation of the rotary feedthrough and the inlet.

17. The device as claimed in claim 7, wherein a drive comprising an electric motor is in operative connection with the flexible body.

18. The device as claimed in claim 7, wherein the flexible body is used as at least one of:
- a drive chain or cable to transmit thrust and/or tensile force in a machine;
- a roller shutter for a machine cover; or
- a slatted roller shutter of a high-speed lifting door.

* * * * *